United States Patent
Wetzstein et al.

(10) Patent No.: US 12,066,625 B2
(45) Date of Patent: Aug. 20, 2024

(54) SYSTEMS AND METHODS FOR EVENT-BASED GAZE TRACKING

(71) Applicant: The Board of Trustees of the Leland Stanford Junior University, Stanford, CA (US)

(72) Inventors: Gordon Wetzstein, Palo Alto, CA (US); Anastasios Nikolas Angelopoulos, Berkeley, CA (US); Julien Martel, Santa Clara, CA (US)

(73) Assignee: The Board of Trustees of The Leland Stanford Junior University, Stanford, CA (US)

( * ) Notice: Subject to any disclaimer, the term of this patent is extended or adjusted under 35 U.S.C. 154(b) by 0 days.

(21) Appl. No.: 17/905,157

(22) PCT Filed: Feb. 26, 2021

(86) PCT No.: PCT/US2021/020065
§ 371 (c)(1),
(2) Date: Aug. 26, 2022

(87) PCT Pub. No.: WO2021/174106
PCT Pub. Date: Sep. 2, 2021

(65) Prior Publication Data
US 2023/0120519 A1   Apr. 20, 2023

Related U.S. Application Data
(60) Provisional application No. 62/983,471, filed on Feb. 28, 2020.

(51) Int. Cl.
  G02B 27/00 (2006.01)
  G02B 27/01 (2006.01)
  G06F 3/01 (2006.01)

(52) U.S. Cl.
  CPC ......... G02B 27/0093 (2013.01); G06F 3/013 (2013.01); G02B 2027/0138 (2013.01)

(58) Field of Classification Search
  CPC ........ G02B 27/0093; G02B 2027/0138; G02B 27/0172; G06F 3/013
  See application file for complete search history.

(56) References Cited

U.S. PATENT DOCUMENTS

| 10,237,481 B2 * | 3/2019 | Newcombe | H04N 25/50 |
| 10,466,779 B1 * | 11/2019 | Liu | G02B 27/0093 |

(Continued)

FOREIGN PATENT DOCUMENTS

| WO | 2019067731 A1 | 4/2019 |
| WO | 2021174106 A1 | 9/2021 |

OTHER PUBLICATIONS

International Preliminary Report on Patentability for International Application PCT/US2021/020065, Report issued Aug. 30, 2022, Mailed on Sep. 9, 2022, 6 Pgs.

(Continued)

Primary Examiner — Mihir K Rayan
(74) Attorney, Agent, or Firm — KPPB LLP

(57) ABSTRACT

Systems and methods for event-based gaze in accordance with embodiments of the invention are illustrated. One embodiment includes an event-based gaze tracking system, including a camera positioned to observe an eye, where the camera is configured to asynchronously sample a plurality of pixels to obtain event data indicating changes in local contrast at each pixel in the plurality of pixels, and a processor communicatively coupled to the camera, and a memory communicatively coupled to processor, where the memory contains a gaze tracking application, where the gaze tracking application directs the processor to, receive the event data from the camera, fit an eye model to the eye using (Continued)

the event data, map eye model parameters from the eye model to a gaze vector, and provide the gaze vector.

18 Claims, 6 Drawing Sheets

(56) References Cited

U.S. PATENT DOCUMENTS

| | | | |
|---|---|---|---|
| 11,543,883 B2* | 1/2023 | Boyle | G06V 40/193 |
| 2011/0150334 A1 | 6/2011 | Du et al. | |
| 2016/0363995 A1* | 12/2016 | Rougeaux | G06F 3/013 |
| 2018/0321826 A1 | 11/2018 | Bereza et al. | |
| 2020/0026349 A1 | 1/2020 | Fontanel et al. | |
| 2021/0405741 A1* | 12/2021 | Nouri | G06F 3/013 |
| 2023/0095462 A1* | 3/2023 | Ollila | G06F 3/014 |
| | | | 348/308 |

OTHER PUBLICATIONS

International Search Report and Written Opinion for International Application No. PCT/US2021/020065, Search completed Apr. 16, 2021, Mailed May 6, 2021, 13 Pgs.

WIPO Priority Document for PCT Application No. PCT/US2018/053143, Filed Sep. 27, 2018, U.S. Appl. No. 62/564,875, filed Sep. 28, 2017, 61 pgs.

Damian, Gisler, "Eye Tracking Using Event-Based Silicon Retina", Institute of Neuroinformatics, UNI-ETH Zurich, 2006, 29 pgs.

Fuhl et al., "ElSe: Ellipse Selection for Robust Pupil Detection in Real-World Environments", Proceedings of the Ninth Biennial ACM Symposium on Eye Tracking Research & Applications, ACM, 2016, 8 pgs.

Fuhl et al., "ExCuSe: Robust Pupil Detection in Real-World Scenarios", International Conference on Computer Analysis of Images and Patterns, Springer, 2015, 12 pgs.

Gallego et al., "Event-based Vision: A Survey", arXiv: 1904.08405v1, Apr. 17, 2019, 25 pgs.

Larsson, Linnéa, "Event Detection in Eye-Tracking Data for Use in Applications with Dynamic Stimuli", Doctoral Dissertation, Lund University, Mar. 4, 2016.

Lenz et al., "Event-based Face Detection and Tracking in the Blink of an Eye", arXiv: 1803.10106v3, Apr. 2, 2019, 9 pgs.

Santini et al., "PuReST: Robust Pupil Tracking for Real-Time Pervasive Eye Tracking", In Proceedings of the 2018 ACM Symposium on Eye Tracking Research & Applications, ACM, 2018, 5 pgs.

Tajrobehkar et al., "Event driven Camera based Eye Tracking", Machine Learning and Applications: An International Journal (MLAIJ) vol. 1, No. 1, Sep. 2014, 20 pgs.

Tian et al., "Dual-State Parametric Eye Tracking", In Proceedings Fourth IEEE International Conference on Automatic Face and Gesture Recognition, 2000, 6 pgs.

* cited by examiner

| Online fitting of $\mathscr{E}$ from events and images |
|---|

1: $\bar{A} = \text{Id}_{5\times 5}, \bar{b} = \vec{0}_5$ ▷ Init. $\bar{A}$ and $\bar{b}$
2: $\bar{A}_{\text{inv.}} = \bar{A}^{-1} = \text{Id}_{5\times 5}$ ▷ If using SMW init. $\bar{A}_{\text{inv.}}$
3: while we are receiving data $d$ do
4:     if $d$ is a frame $I^t$ then
5:         $\mathscr{D}_{\text{img.}} = \{(x,y) \mid \mathbf{K}(\mathbf{H}_\theta(I^t) \circ S_\rho)(x,y) = 1$
6:     else if $d$ is an event $E = (\vec{p} = (x,y)^\mathsf{T}, p, t)$ then
7:         $\mathscr{D}_{\text{evt.}} \leftarrow \mathscr{D}_{\text{evt.}} \cup \vec{p}$ if $\|P_\mathscr{E}(\vec{p}) - \vec{p}\|_2 < \delta$
8:     for all $(x,y) \in \mathscr{D} = \mathscr{D}_{\text{evt.}} \cup \mathscr{D}_{\text{img.}}$ do
9:         $v_{x,y}^\mathsf{T} = (x^2, xy, y^2, x, y)^\mathsf{T}$
10:        $A = \sum_{(x,y)\in\mathscr{D}} v_{x,y} v_{x,y}^\mathsf{T}$
11:        $b = \sum_{(x,y)\in\mathscr{D}} v_{x,y}$
12:     if $|\mathscr{D}| > 1$ then ▷ Batch update (frame/acc. evts.)
13:         $\bar{A} \leftarrow \gamma \bar{A} + (1-\gamma) A$
14:         $\bar{b} \leftarrow \gamma \bar{b} + (1-\gamma) b$
15:         $\bar{A}_{\text{inv.}} \leftarrow \bar{A}^{-1}$ ▷ Full-rank inversion
16:         $\mathscr{E} \leftarrow \bar{A}_{\text{inv.}} \bar{b}$
17:     else ▷ (Event-based update)
18:         $\bar{A}_{\text{inv.}} \leftarrow \frac{1}{\gamma}\bar{A}_{\text{inv.}} - \frac{1-\gamma}{\gamma} \frac{\bar{A}_{\text{inv.}} A \bar{A}_{\text{inv.}}}{\gamma + (1-\gamma) v_{x,y}^\mathsf{T} \bar{A}_{\text{inv.}} v_{x,y}}$ ▷ SMW
19:         $\bar{b} \leftarrow \gamma \bar{b} + (1-\gamma) b$
20:         $\mathscr{E} \leftarrow \bar{A}_{\text{inv.}} \bar{b}$

FIG. 6

SYSTEMS AND METHODS FOR EVENT-BASED GAZE TRACKING

CROSS-REFERENCE TO RELATED APPLICATIONS

The current application is a national stage application of PCT Patent Application No. PCT/US2021/020065 entitled "Systems and Methods for Event-Based Gaze Tracking" filed Feb. 26, 2021 which claims the benefit of and priority under 35 U.S.C. § 119(e) to U.S. Provisional Patent Application No. 62/983,471 entitled "Systems and Methods for Event-Based Gaze Tracking" filed Feb. 28, 2020. The disclosures of PCT Patent Application No. PCT/US2021/020065 and U.S. Provisional Patent Application Ser. No. 62/983,471 are hereby incorporated herein by reference in their entirety.

FIELD OF THE INVENTION

The present invention generally relates to eye tracking, and, more specifically, event-based near-eye gaze tracking.

BACKGROUND

Eye tracking is a field concerned with measuring the point of gaze (where one is looking) and the measurement of motion of an eye relative to a head. Eye trackers (a.k.a. gaze trackers) are devices for measuring eye positions and/or eye movement. Some eye trackers measure the motion of an eye relative to the head rather than gaze. Gaze trackers are increasingly being used for medical and assistive applications.

SUMMARY OF THE INVENTION

Systems and methods for event-based gaze in accordance with embodiments of the invention are illustrated. One embodiment includes an event-based gaze tracking system, including a camera positioned to observe an eye, where the camera is configured to asynchronously sample a plurality of pixels to obtain event data indicating changes in local contrast at each pixel in the plurality of pixels, and a processor communicatively coupled to the camera, and a memory communicatively coupled to processor, where the memory contains a gaze tracking application, where the gaze tracking application directs the processor to, receive the event data from the camera, fit an eye model to the eye using the event data, map eye model parameters from the eye model to a gaze vector, and provide the gaze vector.

In another embodiment, the gaze tracking application further directs the processor to update the gaze vector based on additional event data received from the camera, and provide the updated gaze vector.

In a further embodiment, the eye model is a two-dimensional (2D) eye model.

In still another embodiment, the 2D eye model includes an ellipse representing a pupil of the eye, a parabola representing eyelashes over the eye, and a circle representing glint on the eye.

In a still further embodiment, to fit the eye model, the gaze tracking application further directs the processor to identify a set of pixels in the event data representing locations near the edge of a pupil of the eye as event candidates, identify a set of pixels in the frame data representing locations near the edge of the pupil of the eye as image candidates, calculate the union of the event candidates and image candidates, and fit an ellipse to represent the pupil using the calculated union.

In yet another embodiment, the camera, the processor, and the memory, are part of a head-mounted wearable display.

In a yet further embodiment, the gaze vector is used to control the head-mounted wearable display.

In another additional embodiment, images displayed by the head-mounted wearable display have higher resolution near a gaze point as determined by the gaze vector.

In a further additional embodiment, the camera is further configured to synchronously sample the plurality of pixels to obtain frame data indicating pixel values for each pixel in the plurality of pixels at a given time point, and the gaze tracking application further directs the processor to receive the frame data from the camera, and fit the eye model to the eye using the frame data.

In another embodiment again, a second camera observing a second eye configured to asynchronously sample a second plurality of pixels to obtain a second event data indicating changes in local contrast at each pixel in the second plurality of pixels, and synchronously sample the second plurality of pixels to obtain a second frame data indicating pixel values for each pixel in the second plurality of pixels at a given time point, where the gaze tracking application further directs the processor to receive the second event data from the second camera, receive the second frame data from the second camera, fit a second eye model to the second eye using the event data and the frame data, map second eye model parameters from the second eye model to a second gaze vector, and provide the second gaze vector.

In a further embodiment again, a method of event-based gaze tracking includes asynchronously sampling a plurality of pixels to obtain event data indicating changes in local contrast at each pixel in the plurality of pixels using a camera observing an eye, receiving the event data from the camera at a processor, fitting an eye model to the eye using the event data and the processor, mapping eye model parameters from the eye model to a gaze vector using the processor, and providing the gaze vector using the processor.

In still yet another embodiment, the method further includes updating the gaze vector based on additional event data received from the camera, and providing the updated gaze vector.

In a still yet further embodiment, the eye model is a two-dimensional (2D) eye model.

In still another additional embodiment, the 2D eye model includes an ellipse representing a pupil of the eye, a parabola representing eyelashes over the eye, and a circle representing glint on the eye.

In a still further additional embodiment, fitting the eye model includes identifying a set of pixels in the event data representing locations near the edge of a pupil of the eye as event candidates, identifying a set of pixels in the frame data representing locations near the edge of the pupil of the eye as image candidates, calculating the union of the event candidates and image candidates, and fitting an ellipse to represent the pupil using the calculated union.

In still another embodiment again, the camera and the processor are part of a head-mounted wearable display.

In a still further embodiment again, the gaze vector is used to control the head-mounted wearable display.

In yet another additional embodiment, images displayed by the head-mounted wearable display have higher resolution near a gaze point as determined by the gaze vector.

In a yet further additional embodiment, the method further includes synchronously sampling the plurality of pixels to obtain frame data indicating pixel values for each pixel in the plurality of pixels at a given time point using the camera, receiving the frame data from the camera, and fitting the eye model to the eye using the frame data.

In yet another embodiment again, the method further includes asynchronously sampling a second plurality of pixels to obtain a second event data indicating changes in local contrast at each pixel in the second plurality of pixels using a second camera observing a second eye; and synchronously sampling the second plurality of pixels to obtain a second frame data indicating pixel values for each pixel in the second plurality of pixels at a given time point using the second camera, receiving the second event data from the second camera, receiving the second frame data from the second camera, fitting a second eye model to the second eye using the event data and the frame data, mapping second eye model parameters from the second eye model to a second gaze vector, and providing the second gaze vector.

In a yet further embodiment again, an event-based gaze tracking system, includes a camera positioned to observe an eye, where the camera is configured to: asynchronously sample a plurality of pixels to obtain event data indicating changes in local contrast at each pixel in the plurality of pixels, and a processor communicatively coupled to the camera, and a memory communicatively coupled to processor, where the memory contains a gaze tracking application, where the gaze tracking application directs the processor to receive the event data from the camera, apply a regression to the event data to produce a gaze vector, provide the gaze vector.

In another additional embodiment again, the regression is a neural network.

In a further additional embodiment again, a method of event-based gaze tracking, includes asynchronously sampling a plurality of pixels to obtain event data indicating changes in local contrast at each pixel in the plurality of pixels using a camera observing an eye, receiving the event data from the camera at a processor, applying a regression to the event data using the processor to produce a gaze vector, and providing the gaze vector using the processor.

In still yet another additional embodiment, the regression is a neural network.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

FIG. 6 is pseudocode for fitting a 2D eye model in accordance with an embodiment of the invention.

DETAILED DESCRIPTION

Figure 1:
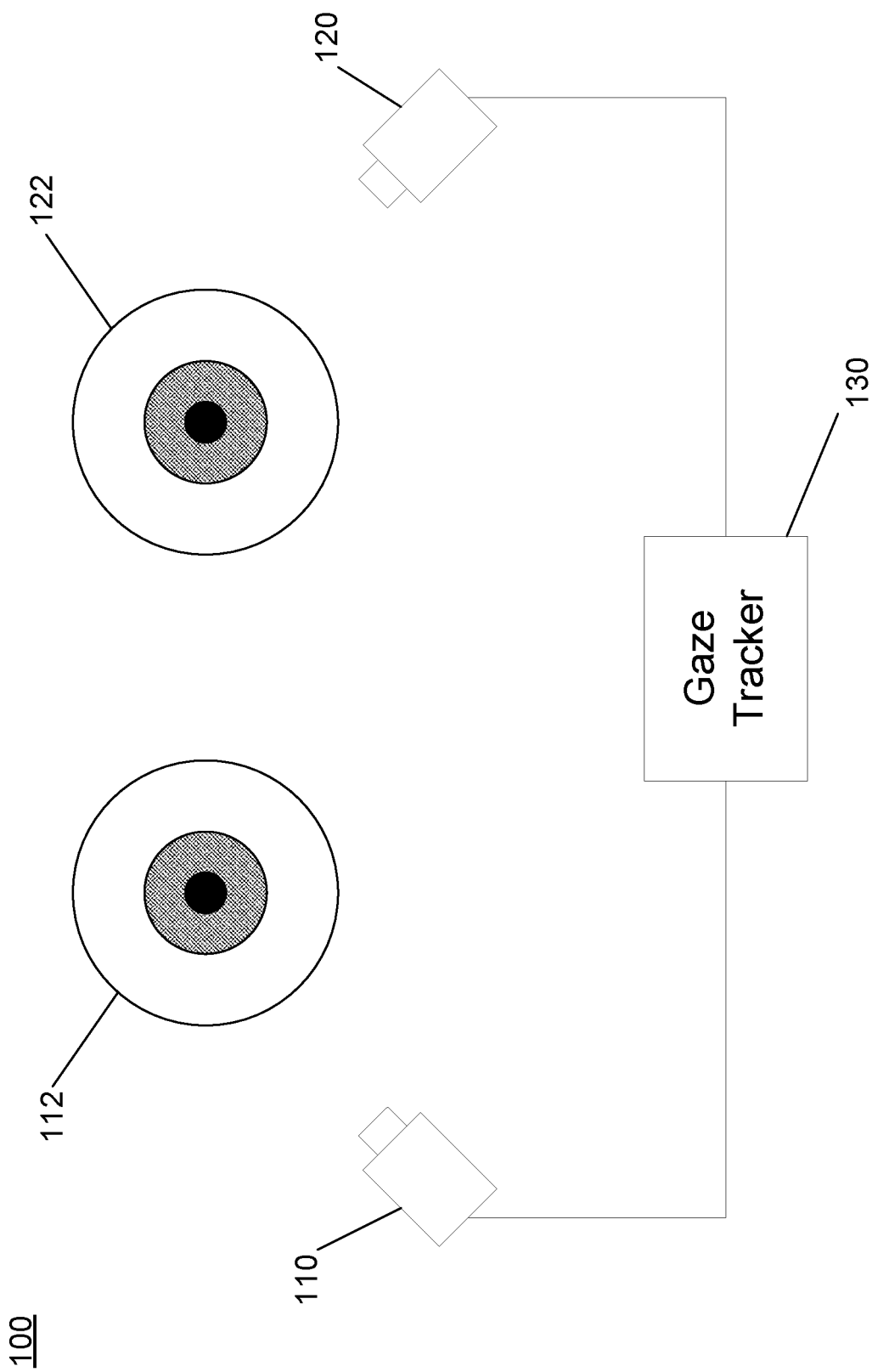
FIG. 1 is a system diagram for an event-based gaze tracking system in accordance with an embodiment of the invention.

Eye tracking has become an important aspect of many different applications in very diverse fields from medical treatments, augmented reality (AR), virtual reality (VR), mixed reality (MR) user interaction, attention monitoring, sports analysis, advertising, and many more. Event-based gaze tracking systems and methods described herein can quickly and accurately measure eye position and/or detect gaze for numerous applications. In many embodiments, event cameras (also referred to as neuromorphic cameras, or dynamic vision sensors (DVS)) are used to obtain information about eye position. Event cameras can asynchronously sample individual pixels and report information on a pixel level whenever they incur a local contrast change. This information, referred to herein as "event data," can be used by event-based gaze tracking systems and methods to infer eye position and/or gaze. In many embodiments, the event data is used to fit an eye model, which in turn is used to determine a gaze vector. Using methods described herein, the gaze vector can be updated more than 10,000 times per second.

In contrast, conventional eye tracking systems comparatively encounter problems with update frequency due to systemic and/or procedural limitations. Conventional camera sensors used by conventional eye tracking systems are significantly limited in the bandwidths they can provide, forcing a tradeoff between camera resolution and framerate. Further, they require relatively high power to operate. To compensate, conventional eye tracking systems use specialized protocols and readout interfaces to maximize bandwidth, but they often sacrifice device form factor which poses a problem for portable operation. Despite these fixes, the underlying "frame-based" operation principal of conventional camera sensors can introduce inefficiencies which makes them less suited for near-eye gaze tracking.

Frame-based camera sensors provide frame data which contains information for each pixel in the camera sensor in a synchronized fashion. While this can be useful for general-purpose operation, in near-eye gaze tracking most pixels capture redundant information, i.e. only the pupil moves while most of the image does not change. That said, in contrast to a frame-based camera sensor, an event camera may not provide all information regarding a scene at any given point, and therefore eye position is inferred from significantly less data. In order to merge the benefits of both a frame-based and event-based approach to gaze tracking, in numerous embodiments, in contrast to conventional methodologies, frames from a conventional camera can be periodically used to correct inaccuracies in inferred motion from event data. In many embodiments, an event camera can produce frame data as well as event data. While in many embodiments frame data can be used to improve performance, systems and methods described herein can use less data to provide increased performance in gaze tracking. However, it is not required that frame data be used. Further, systems and methods provided for herein can track gaze in substantially real-time, including tracking gaze through rapid eye movements. System architectures for event-based gaze tracking are described in further detail below.

Event-Based Gaze Tracking Systems

Event-based gaze tracking systems can utilize event cameras placed near to and pointed at the eyes of a user to acquire event data, which is then processed to determine gaze vectors. Event-based gaze tracking systems can take on many different forms depending on the type of application. For example, in many VR/AR applications, it is advantageous to have a portable head-mounted display into which event cameras can be integrated. Similarly, for a surgical device such as a LASIK eye surgery machine, event-based gaze tracking systems can be integrated into the medical device. That said, in numerous embodiments, event-based gaze tracking systems can be implemented as stand-alone devices. Indeed, any number of different architectures can be used as appropriate to the requirements of specific applications of embodiments of the invention.

Turning now to FIG. 1, an example event-based gaze tracking system in accordance with an embodiment of the invention is illustrated. Event-based gaze tracking system 100 includes a right eye event camera 110 pointed at a right eye of a subject 112, and a left eye event camera 120 pointed at the left eye of a subject 122. In many embodiments, the event camera can also capture frame data (i.e. both frames and events can be captured by the same sensor). In numerous embodiments, only one eye is observed depending on the requirements of the given application. In various embodiments, more than one event camera can be used to observe the same eye. Further, in many embodiments, the right eye event camera and the left eye event camera are mounted on the same hardware platform in order to provide stability. Cameras can operate in any spectrum including, but not limited to, visible, IR, and/or any other wavelength as appropriate to the requirements of specific applications of embodiments of the invention.

As noted above, with event cameras individual pixels are asynchronously sampled and solely report information whenever they incur a local contrast change. An event camera can therefore be interpreted as adapting its sampling rate to the underlying scene motion. In numerous embodiments, an event camera pixel reports a time-stamped data packet whenever the sign of the instantaneous temporal derivative of the incident irradiance exceeds a threshold. This packet is referred to as an event and it contains the location of the pixel incurring the change, the time at which it happened, and in many embodiments, the sign of the change. A collection of these packets is referred to as "event data." For applications where the temporal derivative of a video stream is sparse, event-based capture uses the bandwidth of the system much more efficiently than a frame-based methodology, because only relevant information is sampled and processed. This can lead to significant improvements in update rates and power consumption while providing portable device form factors.

The event cameras are connected to a gaze tracker 130. The gaze tracker is a computing system capable of receiving event data from the event cameras and calculating gaze vectors based on the event data. In numerous embodiments, one or more frame cameras are included in the event-based gaze tracking system and connected to the gaze tracker to provide frame data to augment event-based gaze tracking methods described below.

For example, in many embodiments, gaze trackers can be implemented as part of an AR, VR, or MR headset. Gaze trackers can then be used as a control mechanism for the AR headset. However, having gaze information for an AR headset can be used for other purposes as well. For example, image focusing can be achieved with higher fidelity using gaze information. Further, in some applications, gaze can be used to dictate resolution of different areas of the displayed image in order to save processing power. E.g. areas that the user is focusing on as determined by the gaze tracker can be given more computational resources to render a higher fidelity image in that area.

Figure 2:
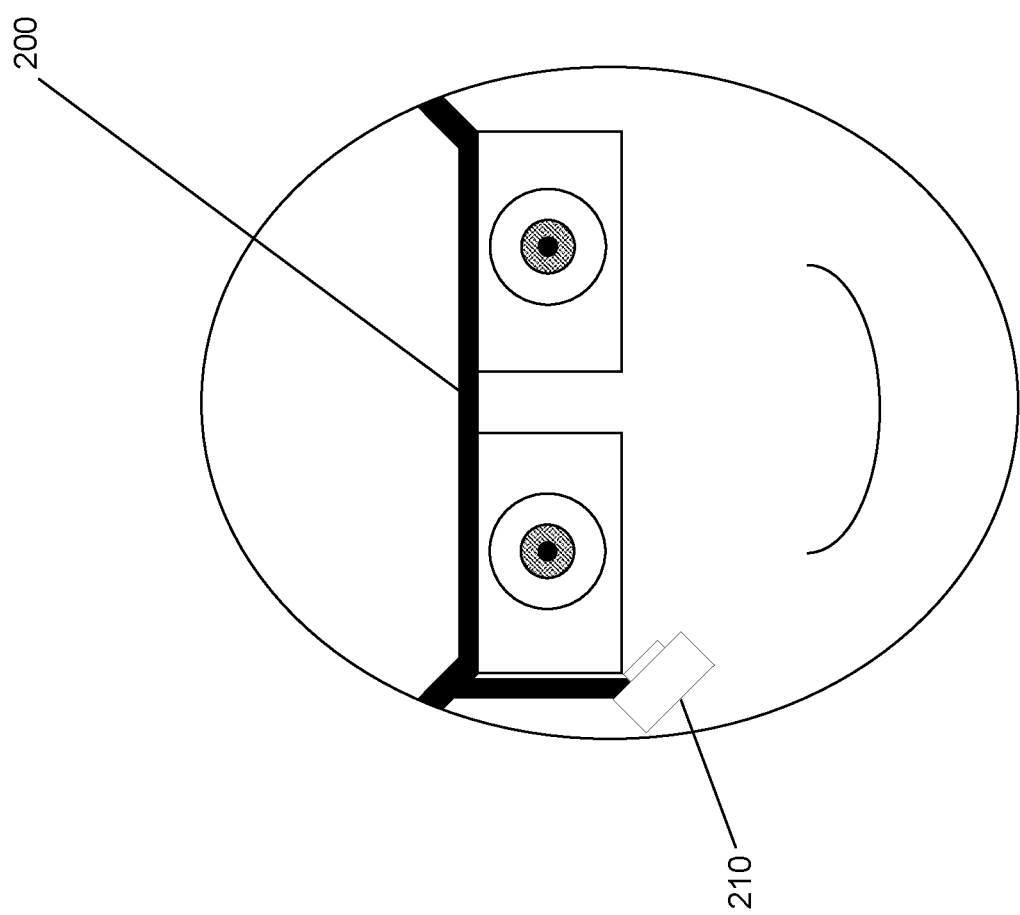
FIG. 2 is a conceptual illustration of a wearable event-based gaze tracker having one camera in accordance with an embodiment of the invention.
Figure 3:
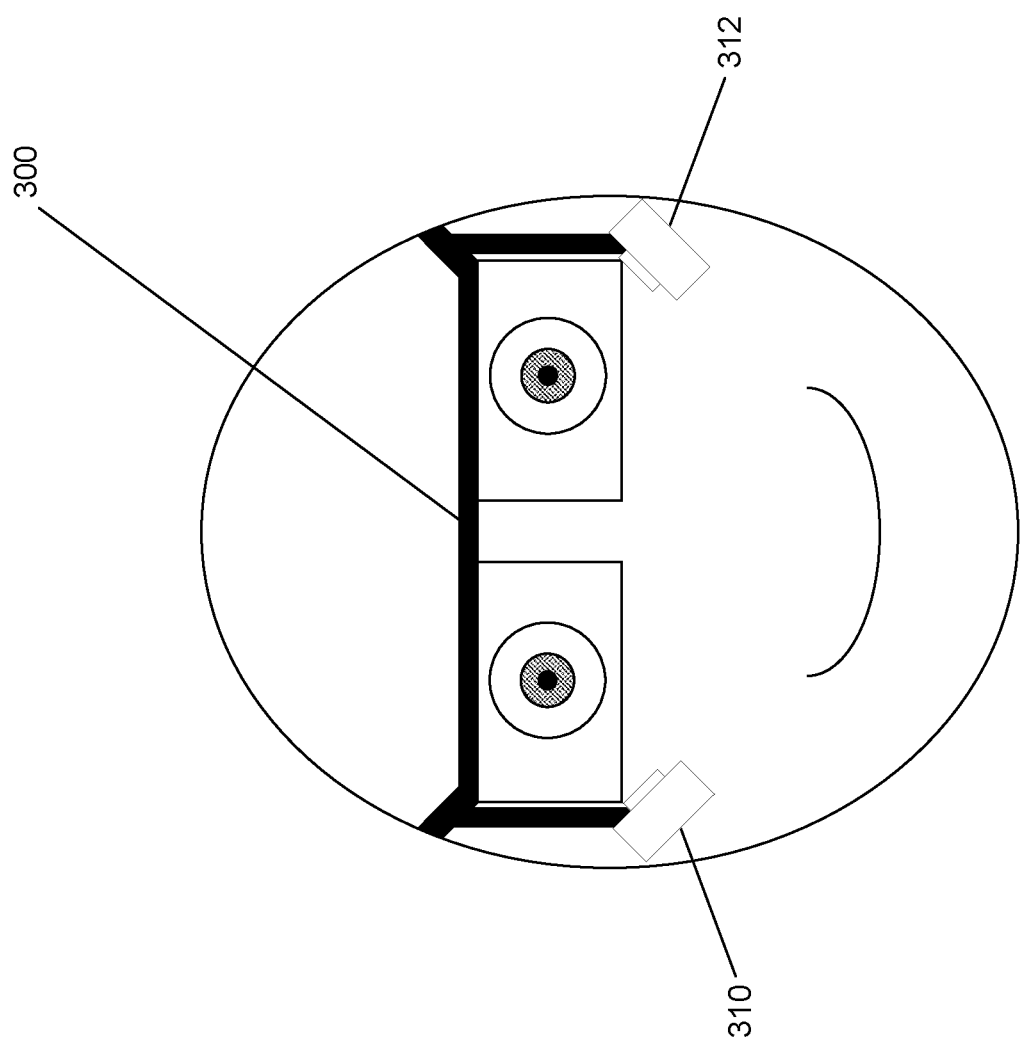
FIG. 3 is a conceptual illustration of a wearable event-based gaze tracker having two cameras in accordance with an embodiment of the invention.

Turning now to FIG. 2, a wearable, head-mounted AR headset incorporating an event-based gaze tracker with a single camera in accordance with an embodiment of the invention is illustrated. The illustrated headset 200 includes a single event camera 210 pointed at the right eye of the user. As can be readily appreciated, the camera could easily be placed on the left side of the headset and pointed at the left eye of the user. In some embodiments, the single camera can see and be used to track gaze in both eyes. However, in various embodiments, the camera sees and is used to track the gaze in a single eye. Gaze determined for a single eye can be extrapolated for some applications to the other eye. Turning now to FIG. 3, a wearable, head-mounted AR headset incorporating an event-based gaze tracker having two cameras in accordance with an embodiment of the invention is illustrated. The illustrated headset 300 includes a first event camera 310 pointed at the right eye and a second event camera 320 pointed at the left eye. As can be readily appreciated the mechanism by which the cameras are attached to the headset can be varied without departing from the scope or spirit of the invention. For example, they can be over the eyes, integrated into the frame of the headset, or attached in any other manner as appropriate to the requirements of specific applications of embodiments of the invention. Architectures for event-based gaze trackers are discussed in further detail below.

Event-Based Gaze Tracker Architecture

Figure 4:
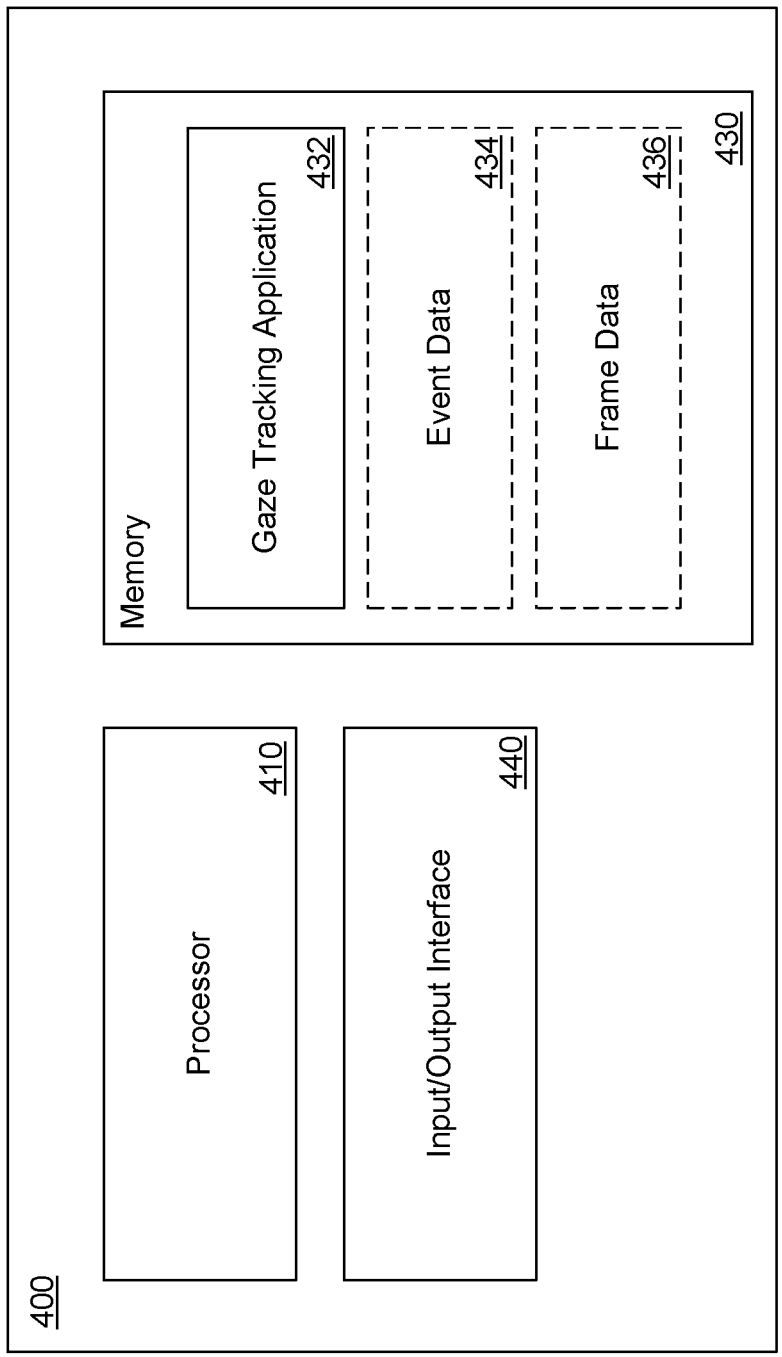
FIG. 4 is a block diagram for an event-based gaze tracker in accordance with an embodiment of the invention.

Event-based gaze trackers are processing devices capable of obtaining event data and calculating gaze vectors from said event data. As form factor is often dependent upon application, event-based gaze trackers in turn can take a wide variety of forms. For example, in numerous embodiments, event-based gaze trackers may be integrated into wearable computing devices. In some embodiments, event-based gaze trackers are integrated into control systems for other devices that benefit from event-based gaze tracking. As noted above, event-based gaze trackers can be implemented as stand-alone hardware. Turning now to FIG. 4, a block diagram of an event-based gaze tracker architecture in accordance with an embodiment of the invention is illustrated.

System 400 includes a processor 410. Processors can be any logic processing unit including, but not limited to, central processing units (CPUs), graphics processing units (GPUs), field-programmable gate arrays (FPGAs), application-specific integrated-circuits (ASICs), and/or any other processing circuitry as appropriate to the requirements of specific applications of embodiments of the invention. The gaze tracker 400 further includes an input/output (I/O) interface 420. The I/O interface can be used to obtain data from event cameras, conventional cameras, and/or any other $3^{rd}$ party device as appropriate to the requirements of specific applications of embodiments of the invention. Similarly, the I/O interface can be used to provide data, including, but not limited to, gaze vectors, from the gaze tracker to any number of different devices.

The event-based gaze tracker 400 includes a memory 430. Memory can be implemented as volatile memory, nonvolatile memory, and/or any combination thereof. The memory contains a gaze tracking application 432 that contains machine-readable instructions for configuring the processor to perform various gaze tracking processes. In numerous embodiments, the memory contains event data 434 obtained from event cameras. In various embodiments, the memory contains frame data 436 obtained from conventional frame-based cameras.

While particular architectures for event-based gaze tracking systems and gaze trackers are illustrated in FIGS. 1-4, as noted above, any number of different architectures can be used as appropriate to the requirements of specific applications of embodiments of the invention. Processes for event-based gaze tracking are discussed in further detail below.

Event-Based Gaze Tracking Processes

As noted above, event-based gaze tracking uses event data to track eye motion and calculate gaze. In many embodiments, event data alone is sufficient to calculate gaze. However, in numerous embodiments, frame data can initially and/or periodically be used to establish a baseline location. Event data can be used to track eye motion in-between the collection of frames, which typically occurs at a much slower rate. In this way, a higher refresh rate can be achieved.

Figure 5:
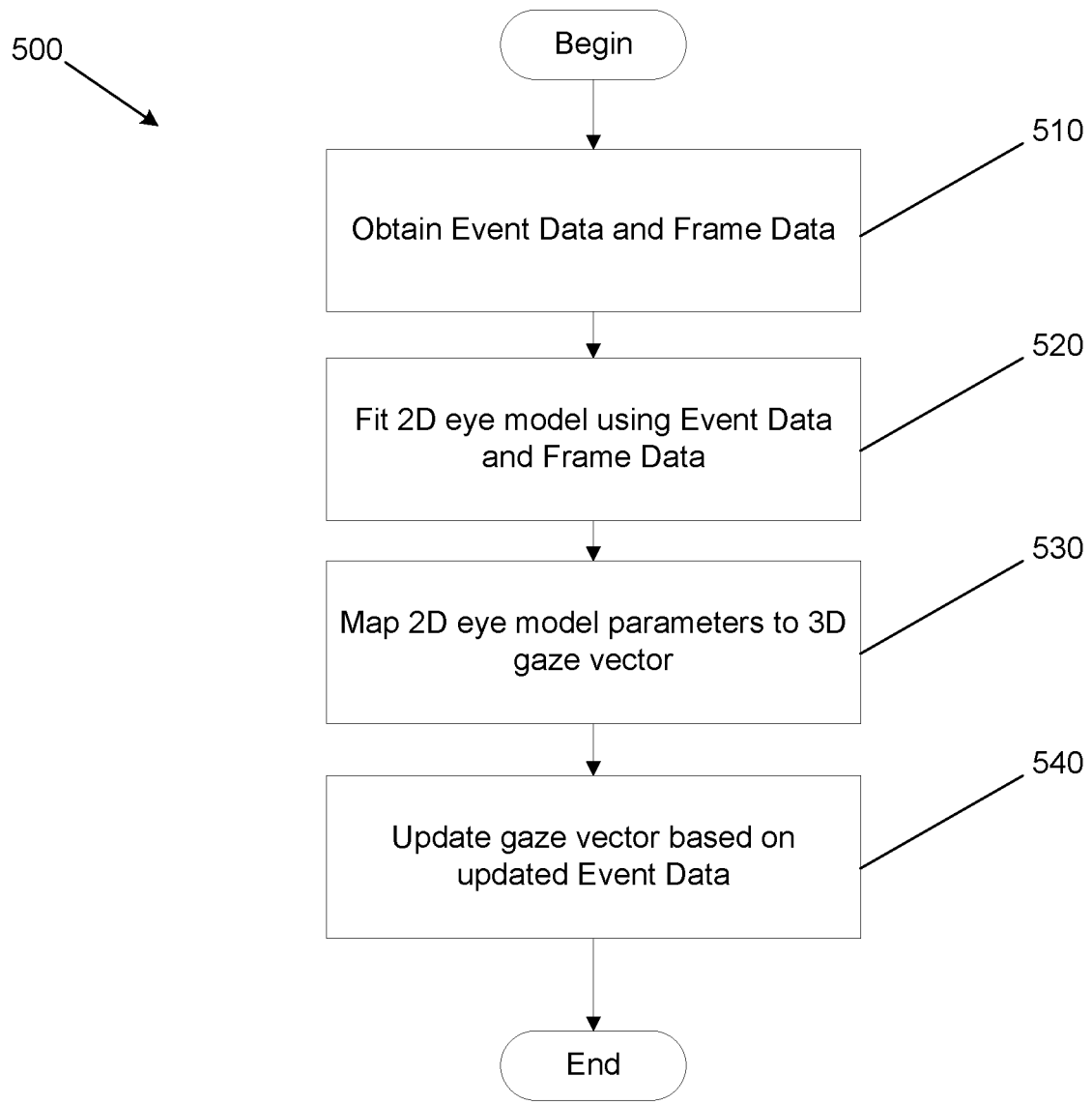
FIG. 5 is a flowchart for an event-based gaze tracking process in accordance with an embodiment of the invention.

A process for using frame data and event data for event-based gaze tracking in accordance with an embodiment of the invention is illustrated in FIG. 5. Process 500 includes obtaining (510) event data and frame data. Event data can be obtained from event cameras, and frame data can be obtained from any camera using frame-based capture. In many embodiments, event data and frame data are obtained from a camera capable of producing both frame data and event data. In various embodiments, frames in the frame data are recorded at a fixed sampling rate, and events are asynchronously recorded at a much higher fixed sampling rate. The event data and frame data dare used to fit (520) a 2D eye model. In numerous embodiments, the 2D eye model is a parametric eye model. A separate 2D eye model can be generated for each eye. The 2D eye model is mapped (530) to a 3D gaze vector, which is updated as additional data (540) are received. Fitting 2D eye models and mapping them to 3D vectors are discussed in additional detail below.

a. 2D Eye Models 2D eye models can reflect the relative position of an eye by identifying and placing eye features. In many embodiments, 2D eye models include an ellipse (or a similar shape) representing the pupil with parameters $\varepsilon = (a, h, b, g, f)^T \in \mathbb{R}^5$, a parabola representing the eyelashes with parameters $\mathcal{P} = (u, v, w)^T \in \mathbb{R}^3$, and a circle representing the glint (e.g. reflection of a light source off the eyeball) with parameters $\mathcal{C} = (r, c)^T \in \mathbb{R}^2$. Therefore, in numerous embodiments, the eye can be fully parameterized by the 11 coefficients in $\mathcal{M} = \{\varepsilon, \mathcal{P}, \mathcal{C}\}$. In various embodiments, $\varepsilon, \mathcal{P}, \mathcal{C}$ are fit separately. Ellipses, parabolas, and circles can be expressed canonically as quadrics so they can be asynchronously estimated using the same method. Further, more, fewer, and/or different parameters could be used as part of a 2D eye model. In numerous embodiments, $\varepsilon$ is estimated from a set of candidate ellipse points $\mathcal{D}$ in the image plane believed to lie on the edge of the pupil.

In order to parameterize the pupil with an ellipse, the location of points $\vec{p} = (x,y)^T$ on the ellipse representing the pupil in the image plane satisfy the quadric equation:

$$E_\varepsilon(\vec{p}) = E_\varepsilon(x,y) = 0$$

with, $E_\varepsilon(x,y) = ax^2 + hxy + by^2 + gx + fy + d$

In many embodiments, $d = -1$ for convenience as it is an arbitrary scaling factor corresponding to the offset of the plane intersecting the conic defined by $\varepsilon = (a, h, b, g, f)$.

For each frame in the frame data, pixels near the edge of the pupil are classified as candidate points $\mathcal{D}_{img}$. Events near the edge of the pupil in the event data are considered candidate points $\mathcal{D}_{evt}$. Thus, the model of the ellipse can ultimately be updated by the set of points $\mathcal{D} = \mathcal{D}_{img} \cup \mathcal{D}_{evt}$.

However, when receiving a frame, under off-axis IR illumination, the pupil tends to appear as a dark blob. By binarizing the greyscale frame I using a constant threshold $\theta$, removing noise on the resulting image using morphological opening, and applying an edge detector, candidate points can be identified by:

$$\mathcal{D}_{img} = \{(x,y) | K(H_\theta(I) \circ S_\sigma)(x,y) = 1\}$$

where $H_\theta$ is the Heaviside function shifted by $\theta$ used for thresholding; $\circ$ denotes morphological opening; $S_\sigma$ is its structuring element, a discretized circle parameterized by its radius $\sigma$; and K is a binary edge detection function. However, any number of different frame-based pupil tracking algorithms outputting a set of candidate points could be used, such as, but not limited to, PuReST, ExCuSe, Else, and/or any other algorithm as appropriate to the requirements of specific applications of embodiments of the invention.

Further, when receiving an event, a candidate point contributing to the fitting of $\varepsilon$ is generated when it falls within a certain distance S of the last estimated ellipse:

$$\mathcal{D}_{evt} = \{(x,y) | \vec{p}(x,y)^T, \|P_\varepsilon(\vec{p}) - \vec{p}\|_2 < \delta\}$$

where $P\varepsilon(\vec{p})$ is the projection of a point $\vec{p}$ on the ellipse, which amounts to solving a system of two equations (one linear and one quadratic) in the ellipse parameterization described above. In many embodiments, $\mathcal{M}$ is updated on an event-by-event basis, in which case $\mathcal{D}_{evt}$ is a singleton containing a single event. However, in numerous embodiments, more than one event is considered per update, in which case $\mathcal{D}_{evt}$ contains more than one event.

The ellipse, parabola, and circle models can be fitted using least squares. The data points $\mathcal{D}_{img}$ coming from the same frame can be thought of as having been generated synchronously, allowing a fitting of the model to the data as a batch. For example, for the ellipse:

$$\varepsilon^* = \arg\min_\varepsilon \sum_{(x,y) \in \mathcal{D}_{img}} E_\varepsilon(x,y)^2$$

whose solution is simply $\varepsilon^* = A^{-1} b$ with and $$A = \sum_{(x,y) \in \mathcal{D}_{img}} v_{x,y} v_{x,y}^T, \quad b = \sum_{(x,y) \in \mathcal{D}_{img}} v_{x,y}$$

$$v_{x,y} = (x^2, xy, y^2, x, y)^T$$

In numerous embodiments, an initial estimate of the ellipse's parameters is generated and then updated with new frame data or event data. This is enabled because A and b are sums and can thus be updated "online." In numerous embodiments, this can be achieved structurally by storing a matrix $\overline{A}$ and a vector $\overline{b}$ that are both updated upon the reception of new candidate points by "summing them in." More formally, when a set of candidate points $\mathcal{D}^t$ arrives at a time t, it is used to produce a matrix $A^t$ and a vector $b^t$. $A^t$ and $b^t$ can then be blended with a matrix $\overline{A}^t$ and a vector $\overline{b}^t$ representing and storing the "current" state of the fit:

$$\overline{A}^{t+1}=\gamma \overline{A}^t+(1-\gamma)A^t$$

$$\overline{b}^{t+1}=\gamma \overline{b}^t+(1-\gamma)b^t, \text{with } \gamma \in [0,1]$$

Using the above formalism, only a single small 5×5 matrix and a 5-dimensional vector need be stored, which blends information in time in a principled way. This can be shown to be equivalent to solving a reweighted least squares problem using all the data points from past frames, weighted by some geometric discount $\gamma$ of the past.

In the case where $\mathcal{D}^t$ arrives from a frame, $A^t$ and $b^t$ can be directly calculated since $A^t$ is usually full rank. In contrast, events arrive one at a time and asynchronously. As such, in order to leverage the low-latency and high-time resolution of the event data generation process, in many embodiments, $\overline{A}$ and $\overline{b}$ are updated from, $\mathcal{D}_{evt}$ as often as every event. In numerous embodiments, an event generates a single candidate point, but $v_{x_t,y_t}$, and the corresponding $A^t$ and $b^t$ can nonetheless be computed similarly as to above. Because $A^t$ is rank-1 ($\varepsilon$ having 5 parameters), it is not invertible. In numerous embodiments, in case one aims at performing an update every N events, $|\mathcal{D}_{evt}|=N$, and $\varepsilon$ is updated batch-wise, similarly to a frame.

Again, applying the above, $\overline{A}$ can be updated as $\overline{A}^{t+1}=\gamma' A^t+(1-\gamma')A^t$, with $\gamma' \in [0,1]$. After the reception of the first 5 events in a non-degenerate configuration, $\overline{A}^t$ is rank-5 and can thus be inverted given continuous blending in new information. Since $v_{x,y}$ and the blending of A and b are both relatively easy to compute, these updates can be performed at a quick rate. However, updating $\varepsilon^*$ eventwise (e.g. ~200 times per millisecond during a saccade) also entails computing $(\overline{A}^t)^{-1}$ eventwise, which may be computationally difficult in real time. To solve this, because every event generates an $A^t$ that is rank-1, $(\overline{A}^t)^{-1}$ can be stored and the Sherman-Morrison-Woodbury (SMW) identity can be used to update it directly, online, after applying a small decay term to downweight old data in time.

As noted above, while the formulations provided are with specific reference to the ellipse $\varepsilon$ fitting, an analogous fitting process can be used for $\mathcal{P}$ and $\mathcal{C}$. For convenience, a summary formalism of the above process is provided in accordance with an embodiment of the invention in FIG. 6. Once $\mathcal{M}$ is fitted, the model can be mapped to a 3D gaze vector. Processes for said mapping are discussed further below.

b. Mapping the Eye-Model to a 3D Gaze Vector

A gaze vector represents the direction a user is looking at. In numerous embodiments, gaze vectors are encoded via a 2D screen coordinate the user is looking at (in the event the user is looking at a screen, also referred to more generally as a 2D plane, e.g. a AR display). The 2D plane the user is focusing on can be adjusted as appropriate to the requirements of specific applications of embodiments of the invention. The coordinate on the 2D plane is denoted as $(x_s, y_s)^T$. Therefore, the problem can be stated as finding a mapping from $\mathcal{M}$ to $(x_s, y_s)^T$. Many different approaches can be used to resolve the mapping. For example, an explicit model can be used to fit the relative poses of the respective camera, the respective eye, and screen along with the projection of the camera and transformation between screen and world coordinates. In contrast, in some embodiments, the output $(x_s, y_s)^T$ can be phenomenologically regressed out from $\mathcal{M}$ using two $2^{nd}$ order polynomial functions $G_{\theta^1}|x$ and $G_{\theta^2}|y$ (one for each coordinate):

$$(\mathcal{M}) = \begin{pmatrix} x_s \\ y_s \end{pmatrix} = \begin{pmatrix} G_{\theta^1}|_x (\mathcal{M}) \\ G_{\theta^2}|_y (\mathcal{M}) \end{pmatrix}$$

However, in many, embodiments, higher order polynomial functions can be used.

An advantage of using such a polynomial $G_\theta$ to map an eye model to 2D plane coordinate is that it requires very little computation to evaluate. Therefore, it is well suited to high frequency event updates. Regressing the parameters $\theta$ of $G_\theta$ requires $(\mathcal{M}, (x_s, y_s))$ input-output training pairs, the exact number depending on the exact degree of the polynomial. In numerous embodiments, the training pairs are obtained during calibration by extracting the pupil center and regressing against a known gaze point.

As noted above, the gaze vector can be repeatedly updated as new frame data and event data become available. The gaze vectors can be used for any number of applications which would benefit from knowing the gaze of a user. Further, in many embodiments, two gaze vectors (one from each eye) can be compared and used to determine a specific focus point in 3D space. Although specific systems and methods for event-based gaze tracking are discussed above, many different fabrication methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An event-based gaze tracking system, comprising:
   a camera positioned to observe an eye, where the camera is configured to:
      asynchronously sample a plurality of pixels to obtain event data indicating changes in local contrast at each pixel in the plurality of pixels; and
   a processor communicatively coupled to the camera; and
   a memory communicatively coupled to processor, where the memory contains a gaze tracking application, where the gaze tracking application directs the processor to:
      receive the event data from the camera;
      identify a set of pixels in the event data representing locations near the edge of a pupil of the eye as event candidates;
      identify a set of pixels in the frame data representing locations near the edge of the pupil of the eye as image candidates;
      calculate the union of the event candidates and image candidates; and
      fit an ellipse to represent the pupil as an eye model using the calculated union;
      map eye model parameters from the eye model to a gaze vector; and
      provide the gaze vector.

2. The event-based gaze tracking system of claim 1, wherein the gaze tracking application further directs the processor to:
   update the gaze vector based on additional event data received from the camera; and
   provide the updated gaze vector.

3. The event-based gaze tracking system of claim 1, wherein the eye model is a two-dimensional (2D) eye model.

4. The event-based gaze tracking system of claim 3, wherein the 2D eye model comprises:
- an ellipse representing a pupil of the eye;
- a parabola representing eyelashes over the eye; and
- a circle representing glint on the eye.

5. The event-based gaze tracker of claim 1, wherein the camera, the processor, and the memory, are part of a head-mounted wearable display.

6. The event-based gaze tracker of claim 5, wherein the gaze vector is used to control the head-mounted wearable display.

7. The event-based gaze tracker of claim 5, wherein images displayed by the head-mounted wearable display have higher resolution near a gaze point as determined by the gaze vector.

8. The event-based gaze tracker of claim 1, wherein: the camera is further configured to synchronously sample the plurality of pixels to obtain frame data indicating pixel values for each pixel in the plurality of pixels at a given time point; and
- the gaze tracking application further directs the processor to:
  - receive the frame data from the camera; and
  - fit the eye model to the eye using the frame data.

9. The event-based gaze tracker of claim 1, further comprising a second camera observing a second eye configured to:
- asynchronously sample a second plurality of pixels to obtain a second event data indicating changes in local contrast at each pixel in the second plurality of pixels; and
- synchronously sample the second plurality of pixels to obtain a second frame data indicating pixel values for each pixel in the second plurality of pixels at a given time point;
- where the gaze tracking application further directs the processor to:
  - receive the second event data from the second camera;
  - receive the second frame data from the second camera;
  - fit a second eye model to the second eye using the event data and the frame data;
  - map second eye model parameters from the second eye model to a second gaze vector; and
  - provide the second gaze vector.

10. A method of event-based gaze tracking, comprising:
- asynchronously sampling a plurality of pixels to obtain event data indicating changes in local contrast at each pixel in the plurality of pixels using a camera observing an eye;
- receiving the event data from the camera at a processor;
- fitting an eye model to the eye using the event data and the processor by:
  - identifying a set of pixels in the event data representing locations near the edge of a pupil of the eye as event candidates;
  - identifying a set of pixels in the frame data representing locations near the edge of the pupil of the eye as image candidates;
  - calculating the union of the event candidates and image candidates; and
  - fitting an ellipse to represent the pupil using the calculated union;
- mapping eye model parameters from the eye model to a gaze vector using the processor; and
- providing the gaze vector using the processor.

11. The method of event-based gaze tracking of claim 10, further comprising:
- updating the gaze vector based on additional event data received from the camera; and
- providing the updated gaze vector.

12. The method of event-based gaze tracking of claim 10, wherein the eye model is a two-dimensional (2D) eye model.

13. The method of event-based gaze tracking of claim 12, wherein the 2D eye model comprises:
- an ellipse representing a pupil of the eye;
- a parabola representing eyelashes over the eye; and
- a circle representing glint on the eye.

14. The method of event-based gaze tracking of claim 10, wherein the camera and the processor are part of a head-mounted wearable display.

15. The method of event-based gaze tracking of claim 14, wherein the gaze vector is used to control the head-mounted wearable display.

16. The method of event-based gaze tracking of claim 14, wherein images displayed by the head-mounted wearable display have higher resolution near a gaze point as determined by the gaze vector.

17. The method of event-based gaze tracking of claim 10, further comprising:
- synchronously sampling the plurality of pixels to obtain frame data indicating pixel values for each pixel in the plurality of pixels at a given time point using the camera;
- receiving the frame data from the camera; and
- fitting the eye model to the eye using the frame data.

18. The method of event-based gaze tracking of claim 10, further comprising:
- asynchronously sampling a second plurality of pixels to obtain a second event data indicating changes in local contrast at each pixel in the second plurality of pixels using a second camera observing a second eye; and
- synchronously sample the second plurality of pixels to obtain a second frame data indicating pixel values for each pixel in the second plurality of pixels at a given time point using the second camera;
- receiving the second event data from the second camera;
- receiving the second frame data from the second camera;
- fitting a second eye model to the second eye using the event data and the frame data;
- mapping second eye model parameters from the second eye model to a second gaze vector; and
- providing the second gaze vector.

* * * * *